US006765695B2

(12) United States Patent
Chen et al.

(10) Patent No.: US 6,765,695 B2
(45) Date of Patent: Jul. 20, 2004

(54) COLOR PROCESSING ARCHITECTURE AND ALGORITHMS FOR COLOR LASER PRINTERS

(75) Inventors: Jau-Yuen Chen, Palo Alto, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 09/953,699

(22) Filed: Sep. 12, 2001

(65) Prior Publication Data

US 2003/0053086 A1 Mar. 20, 2003

(51) Int. Cl.$^7$ ............................................... G06K 15/00
(52) U.S. Cl. ...................... 358/1.9; 358/515; 358/3.05; 358/3.13; 358/3.21; 358/3.23
(58) Field of Search ................. 358/500, 515, 358/517, 530, 1.9, 2.1, 3.05, 3.03, 3.13, 3.15, 3.2, 3.23

(56) References Cited

U.S. PATENT DOCUMENTS

| | | | |
|---|---|---|---|
| 5,812,146 A | 9/1998 | Sato et al. ................. 345/501 |
| 5,875,044 A | 2/1999 | Seto et al. ................. 358/518 |
| 5,905,490 A | 5/1999 | Shu et al. ................... 345/199 |
| 5,946,454 A | 8/1999 | Shu et al. ................... 395/109 |
| 5,963,714 A | 10/1999 | Bhattacharjya et al. ..... 395/109 |
| 5,978,553 A | 11/1999 | Ikeda ......................... 395/109 |
| 6,035,103 A | 3/2000 | Zuber ......................... 395/109 |
| 6,049,394 A | 4/2000 | Fukushima ................. 358/1.9 |
| 6,052,203 A | 4/2000 | Suzuki et al. ............... 358/1.9 |
| 6,111,658 A | 8/2000 | Tabata ........................ 358/1.9 |
| 6,128,094 A | 10/2000 | Smith ........................ 358/1.15 |
| 6,369,913 B2 * | 4/2002 | Aoyagi ....................... 358/1.9 |

FOREIGN PATENT DOCUMENTS

| EP | 0 859 507 | 8/1998 | .......... H04N/1/405 |
|---|---|---|---|
| EP | 0 886 435 | 12/1998 | ............ H04N/1/40 |

* cited by examiner

Primary Examiner—Jerome Grant, II
(74) Attorney, Agent, or Firm—Michael T. Gabrik

(57) ABSTRACT

Color processing architecture and algorithms (CPAA) for color laser printers process and handle incoming RGB image data effectively to achieve high performance, high quality image printing with low memory requirements. CPAA supports a new data structure for faster raster operation processing (ROP) for color laser printers. The CPAA architecture advantageously improves the flow of data through the processing pipeline to provide high speed at higher resolutions, e.g., at 600 and 1200 dpi. An advance quantizer using multilevel dithering flexibly reduces bits to support fast ROP and to enable fast conversion to CMYK data with only a simple look-up table (LUT) operation by a color matching module, while an adaptive filter maintains high image quality.

19 Claims, 4 Drawing Sheets

COLOR PROCESSING ARCHITECTURE AND ALGORITHMS FOR COLOR LASER PRINTERS

BACKGROUND OF THE INVENTION

1. Field of the Invention

This invention relates to an apparatus and methods for processing color image data, particularly for output on color printers and also relates to programs of instructions for implementing various aspects of the processing. More particularly, the invention pertains to high performance, low memory color processing architecture and algorithms for color printers, particularly color laser printers.

2. Description of the Related Art

Laser printers, both color and black & white, are widely used as output devices in home and office computers. Such printers are particularly popular in computing environments where relatively high speed is desired. In addition to the demand for high speed, there is also a growing demand for higher quality printing. However, since these characteristics are generally inversely related, higher quality comes at the expense of slower throughput. That is, the more intensive processing required to produce a higher quality output slows the print output rate.

In conventional laser printer systems, an image processing unit accepts input from a printer driver and generates pulse wave modulated (PWM) video data to drive the laser engine. In such systems, the graphics objects are typically first rendered into 24 bits/pixel RGB data and 8 bits/pixel in an X field, where R, G and B respectively represent red, green and blue color intensities and X indicates whether the pixel is a text, graphics or image pixel. Raster operation processing (ROP) instructions are then performed in 24-bit RGB color space. The ROP codes define how the graphics device interface (GDI) combines the bits from the selected pen with the bits in the destination map. The RGBX data is then converted into CMYKX data and written to memory in compressed format. At higher output resolutions (e.g., 600 dpi and up) this processing is quite time consuming on conventional systems and tends to create a bottleneck in the processing pipeline. The post-decompression operations provided by color resolution improvement technology (CRIT) and color photo graphic improvement (CPGI), which are used to generate PWM-formatted signals also slow considerably at higher output resolutions.

OBJECTS AND SUMMARY OF THE INVENTION

OBJECTS OF THE INVENTION

It is therefore an object of the present invention to provide improvements in processing and printing color image data, particularly at higher output resolutions.

It is another object of this invention to provide high performance, high quality color laser printing with low memory requirements.

SUMMARY OF THE INVENTION

According to one aspect of this invention, a method for processing color digital data is provided. The method comprises the steps of: (a) receiving color digital data in the form of a plurality of digital elements, each digital element being represented in a first color space having a plurality of first base color components and being defined by n bits/base color component, $1 \leq n$; (b) performing quantization and multi-level dithering using a pre-defined dither matrix on the received digital elements to distribute a quantization error within the spatial domain; (c) performing color matching by converting the representation of the digital elements from the first color space to a second color space having a plurality of second base color components using only a look-up table operation; and (d) adaptively filtering the color digital data based on a predetermined step size of the quantization. Step (c) may be carried out either before or after step (d).

The quantization and multi-level dithering carried out in step (b) reduces n to m, where m<n.

The method may further comprise the steps of: compressing the received color digital data after step (b) is carried out; storing the compressed and dithered color digital data; and decompressing the stored color digital data before step (c) or (d), whichever is carried out first.

In one embodiment, the adaptive filtering of step (d) comprises applying a pre-defined filter kernel to a pre-filtered value of each digital element to generate a post-filtered value of that digital element, and accepting that digital element's post-filtered value if the absolute difference between its pre-filtered and post-filtered values is less than the predetermined step size of the quantization, otherwise retaining its pre-filtered value.

In another embodiment, the adaptive filtering of step (d) comprises applying a pre-defined filter kernel to pre-filtered values of a neighborhood of digital elements surrounding and including a currently examined digital element to generate corresponding post-filtered values for the neighborhood of digital elements, and replacing a particular digital element's pre-filtered value with its post-filtered value if the absolute difference between its post-filtered value and the pre-filtered value of the currently examined digital element is less than the predetermined step size of the quantization, otherwise replacing that particular digital element's pre-filtered value with the pre-filtered value of the currently examined pixel.

In another aspect, the invention involves an apparatus for processing color digital data. The apparatus comprises an advance quantizer that receives color digital data in the form of a plurality of digital elements, each digital element being represented in a first color space having a plurality of first base color components and being defined by n bits/base color component, $1 \leq n$, wherein the advance quantizer performs quantization and multi-level dithering using a pre-defined dither matrix on the received digital elements to distribute a quantization error within the spatial domain; a color matching module, in communication with the advance quantizer, that performs color matching by converting the representation of the digital elements from the first color space to a second color space having a plurality of second base color components using only a look-up table operation; and an adaptive filter, in communication with the color matching module, that filters the color digital data based on a predetermined step size of the quantization; wherein the color matching is performed either before or after the adaptive filtering.

The apparatus may further comprise a compression module that compresses color digital data output from the advance quantizer; a memory that stores the compressed and dithered color digital data; and a decompression module that decompresses the stored color digital data before color matching or adaptive filtering is performed, whichever occurs first.

The advance quantizer, the color matching module and the adaptive filter are preferably embodied in image processing unit.

The advance quantizer, the color matching module and the adaptive filter are each implemented by either software or hardware.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), programmable logic device (PLD), or field programmable logic device (FPLD)), or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 6 is an exemplary dither matrix for use with embodiments of the invention.

DESCRIPTION OF THE PREFERRED EMBODIMENTS

A. Overview

The color processing architecture and algorithms (CPAA) which are the primary subject of this invention process and handle RGB data effectively to provide high performance, high quality printing with low memory requirements. Advantageously, CPAA supports a new data structure for faster raster operation processing (ROP) for color laser printers.

Figure 1:
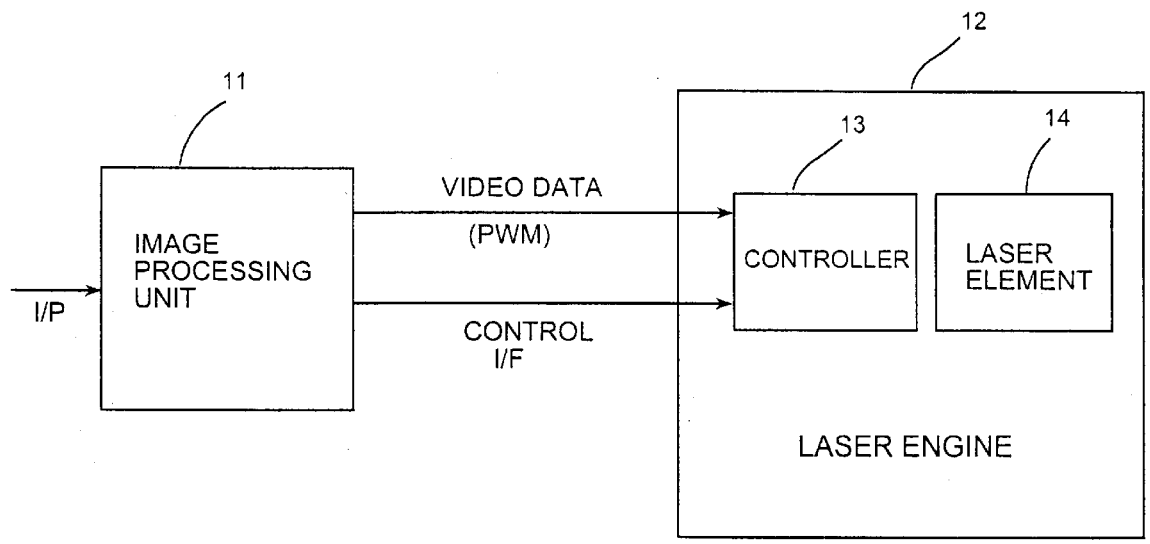
FIG. 1 is a block diagram illustrating the relationship between an image processing unit and various laser printer engine components.

Referring to FIG. 1, the relationship between an image processing unit 11 and a laser printer engine 12 is illustrated. Image processing unit 11 receives an input signal (I/P) from a printer driver (not shown) and generates PWM-formatted video data to drive laser printer engine 12 according to a control interface (I/F) signal transmitted from the unit 11 to engine 12. Image processing unit 11 may be implemented with appropriate software modules, or by hardware components such as ASICs, PLDs, or FPLDs. As shown in FIG. 1, laser printer engine 12 includes a controller 13 and a laser element 14. The invention herein primarily concerns the processing of the I/P signal by the image processing unit 11 to generate the PWM signals. This processing is described below.

B. CPAA Block Diagram

Figure 2:
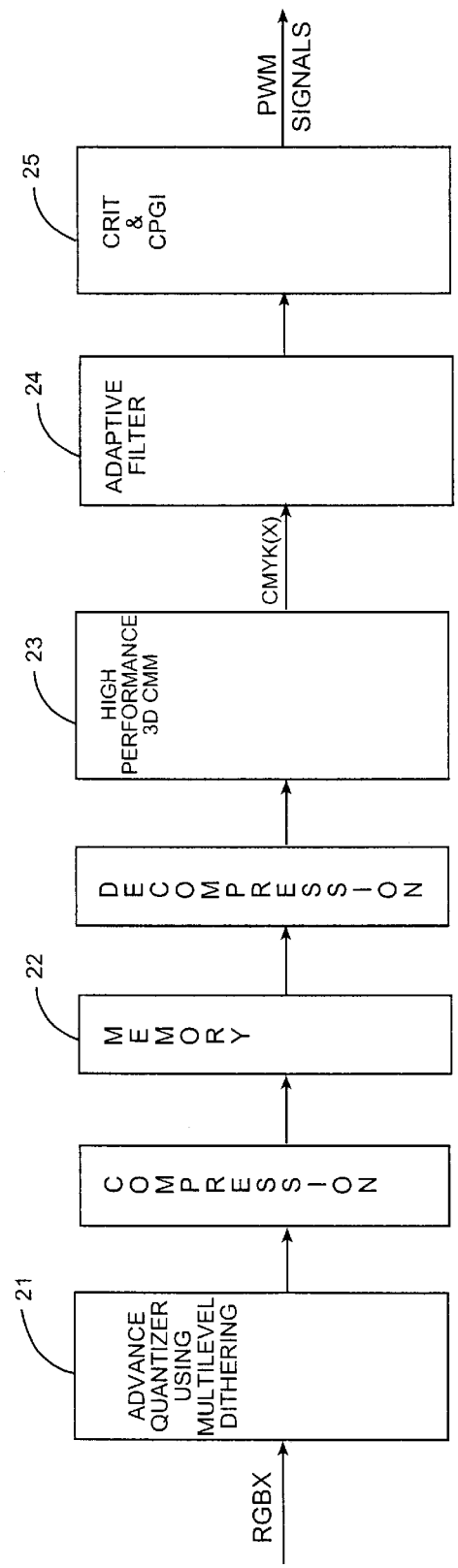
FIG. 2 is a block and flow diagram illustrating color processing architecture and algorithms (CPAA) according to one embodiment of the invention.

A functional block and flow diagram illustrating color processing architecture and algorithms (CPAA) according to a first embodiment of the invention is illustrated in FIG. 2. After raster operation (ROP) instructions are performed in RGB color space, the RGBX signal is input to an advance quantizer 21 that uses multi-level dithering to quantize the RGBX data in advance of further processing. The output of advance quantizer 21 is compressed and stored in memory 22. After the data is decompressed, it is input to a unit 23 which performs high performance 3D color matching management (CMM). The resulting RGBX data is then converted into CMYKX data and input to an adaptive filter 24. After adaptive filtering, a module 25 incorporating color resolution improvement technology (CRIT) and color photo graphic improvement (CPGI) features generates PWM signals. CRIT and CPGI operations are described in more detail in U.S. Pat. No. 6,052,203, the entire disclosure of which is incorporated by reference herein.

C. CPAA Algorithms

The CPAA algorithms comprise three primary components, advance quantizer 21 using multi-level dithering, high performance 3D CMM 23, and adaptive filter 24. These components and the functions they perform are described below. Optional gamma correction/decorrection operations and advantageous variations for a 1-bit case are also described.

1. Advance Quantizer using Multi-level Dithering

A simple lossy memory reduction technique involves the use of a uniform quantizer which reduces the number of bits for each channel. However, even with a good codebook design, such a quantizer usually generates contouring artifacts, especially around smooth transition areas of an image. The advance quantizer 21 of the present invention which combines the features of a uniform quantizer with a multi-level dithering technique using a specifically designed dither matrix to reduce the bit size of the pixel representation of an image from n bits/channel to m bits/channel, where n and m are each integers and where m<n. Typically, n is 8 and, when that is the case, m is an integer from 1 to 7. This operation, and in particular the multi-level dithering, reduces unwanted contouring artifacts by distributing the quantization error in the spatial domain.

Figure 3:
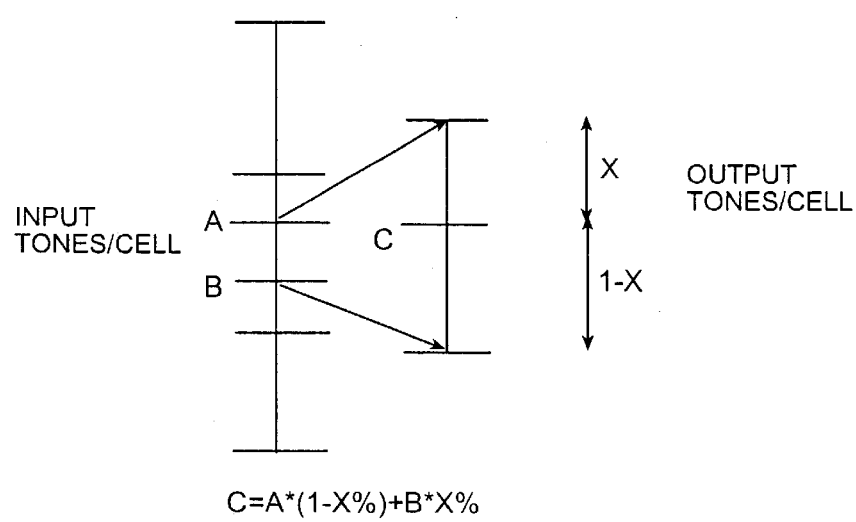
FIG. 3 is a schematic illustration of a multi-level dithering technique which may be advantageously employed as part of the CPAA according to embodiments of the invention.
Figure 6:
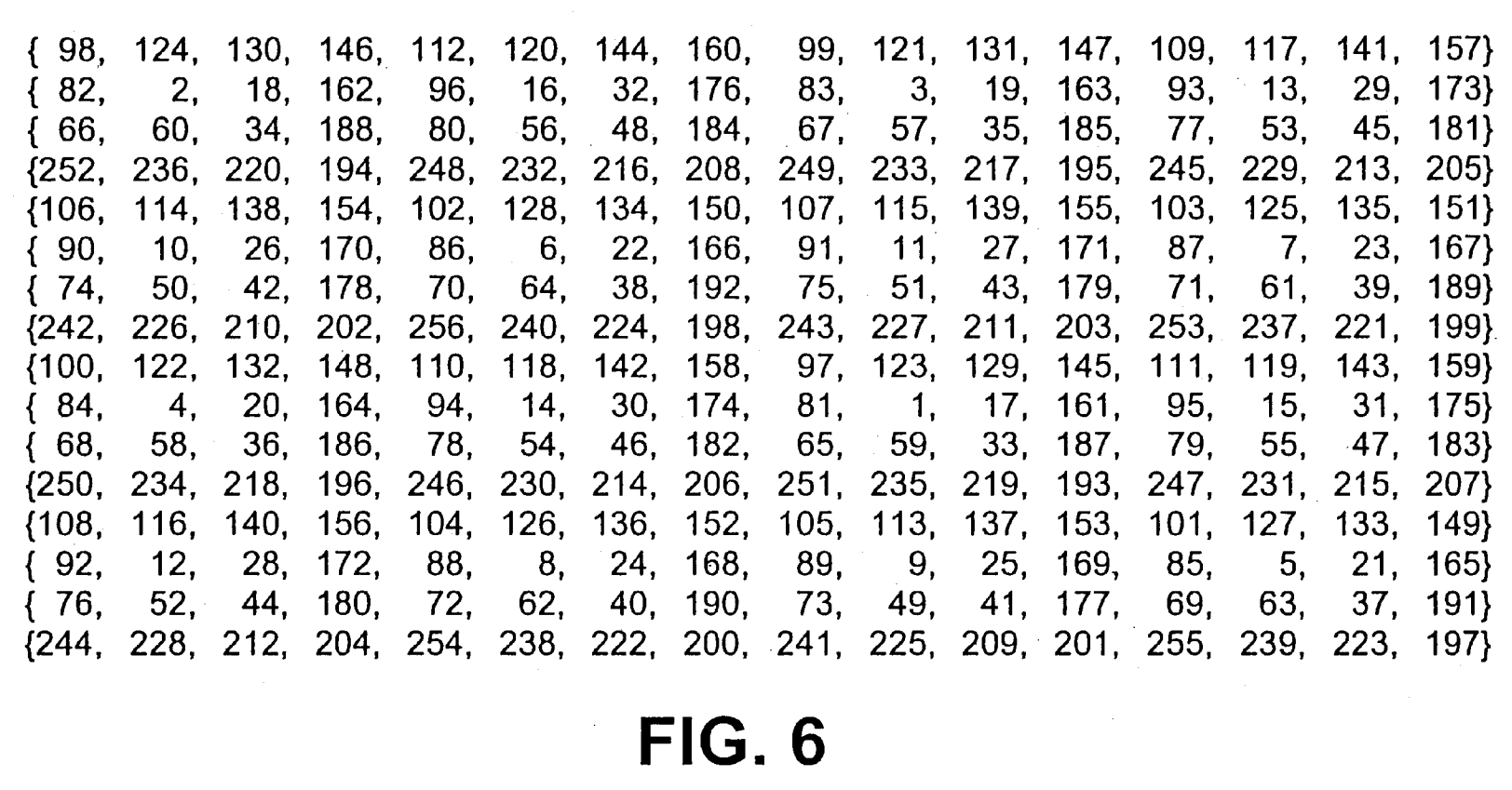

For example, for a pixel value c between quantization steps a and b which has screen fonts A and B, the output screen font C can be computed as $C=A*(1-X\%)+B*X\%$, as illustrated in FIG. 3. For each individual pixel with value c, the output of advance quantizer 21 is set to value a with probability $(1-X/100)$ and set to value b with probability $X/100$. In one embodiment, the selection between value a and value b is based on a standard dithering technique using a 16×16 dither matrix defined in FIG. 6.

Of the various reduction combinations that are possible, the more preferred ones are: 2 bytes/pixel (5 bits each for red and green, 4 bits for blue, and 2 bits for X); 1 byte/pixel (2 bits each for red, green and blue, and 2 bits for X); and ½ bytes/pixel (1 bit each for red, green and blue, and 1 bit for X).

2. High Performance 3D CMM

In conventional systems where the input is 24 bits/pixel, a 256×256×256 LUT look-up table (LUT) is typically required for the RGB to CMYK color conversion. Such a large table has various drawbacks, one of which it is not feasible for ASIC design. Therefore, color conversion in such systems usually includes a region judging process for judging which region of the 3D color space contains the input value; a representative points selecting process for selecting representative points in the vicinity of the input value among representative points discretely arranged along (or within) the selected representative points' dispersed axis; a LUT which stores coordinates of representative points and color correction data; and a simple linear or complicated tetrahedral interpolation process for performing color conversion by weighting based on the selected representative points. However, with the present invention, because the advance quantizer 21 greatly reduces the number of bits per channel, the RGB to CMYK conversion can be done by a much smaller LUT. Therefore, the present invention advantageously eliminates the need for the region judging process, the representative points selecting process, and the interpolation process. In one embodiment, a 32×32×16 LUT is used for an initial I/P signal of 16 bits/pixel which comprises 5 bits for R, 5 bits for G, 4 bits for B, and 2 bits for X. Thus, the resulting 3D CMM operation involves only a simple table look up operation.

3. Adaptive Filter for Noise Reduction

Although the multi-level dithering spreads the quantization error across the spatial domain, there may still be some noticeable color jumps. Because most printers normally apply some type of dithering technique to generate the video signal which drives the printer engine, applying another dithering technique here might interfere with the printer dithering to create undesired artifacts. Therefore, an adaptive filtering process is employed to reconstruct the quantized signal before a halftoning process is performed to avoid such problems.

Two adaptive filter approaches are provided, one based on pre-filtered data and the other based on post-filtered data. The post-filter approach accepts a filtered value if the difference between the filtered value and the original value is less than a predetermined value. The post-filtered approach is defined by following equation:

$$\bar{x} = H \cdot x$$

$$H = \frac{1}{16}\begin{bmatrix} 1 & 2 & 1 \\ 2 & 4 & 2 \\ 1 & 2 & 1 \end{bmatrix}$$

$$\hat{x} = \begin{cases} \bar{x}, & |x - \bar{x}| < \Delta \\ x, & |x - \bar{x}| \geq \Delta \end{cases}$$

where $\Delta$ is the step size of the quantizer

The post-filtered approach preserves region boundary, but smoothes the thin line pattern.

The pre-filtered approach preserves even thin lines by replacing outlying data in the neighborhood of x with a current value. The pre-filtered approach is defined by following equation:

$$\hat{x} = H \cdot x$$

$$H = \frac{1}{16}\begin{bmatrix} 1 & 2 & 1 \\ 2 & 4 & 2 \\ 1 & 2 & 1 \end{bmatrix}$$

$$x = \begin{bmatrix} x_{i-1j-1} & x_{i-1j} & x_{i-1j+1} \\ x_{ij-1} & x_{ij} & x_{ij+1} \\ x_{i+1j-1} & x_{i+1j} & x_{i+1j+1} \end{bmatrix}$$

-continued $$x_{mn} = \begin{cases} x_{mn}, & |x_{mn} - x_{ij}| < \Delta \\ x_{ij}, & |x_{mn} - x_{ij}| \geq \Delta \end{cases}$$

where $\Delta$ is the step size of the quantizer.

4. Optional Pre- and Post-Gamma Correction/De-correction

Figure 4:
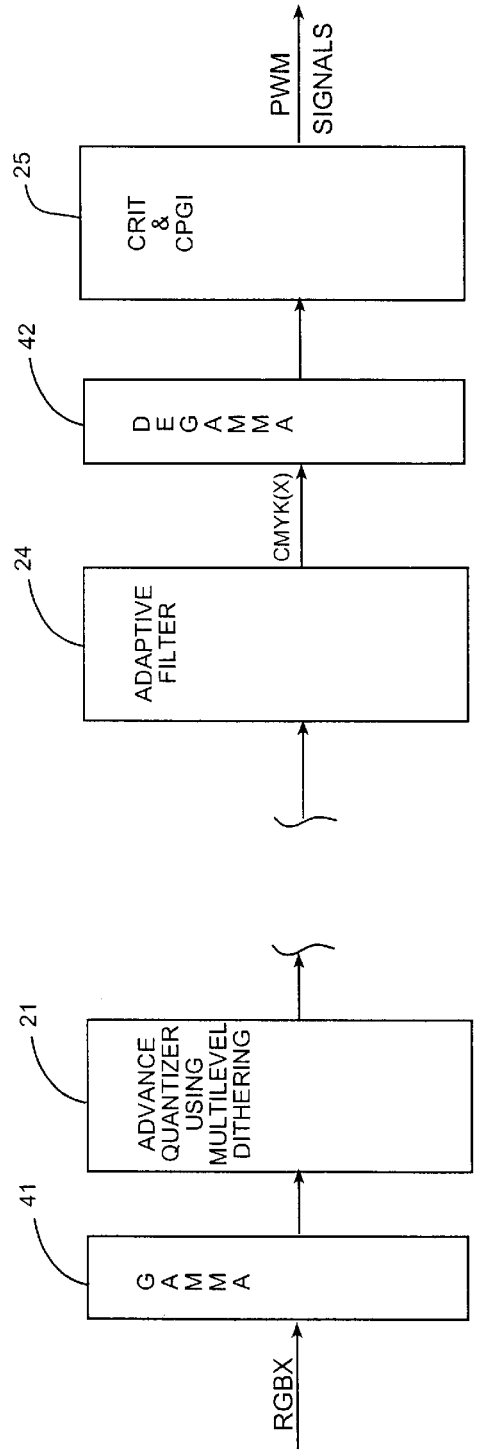
FIG. 4 is a block and flow diagram illustrating CPAA with pre-gamma correction and post-gamma decorrection operations included.

Known gamma correction/de-correction operations can be optionally added if desired to compensate for printer non-linearity and to more fully utilize the printer gamut. If employed, gamma correction is performed by module 41 before the data is quantized by advance quantizer 21 and the gamma de-correction is performed by module 42 after the adaptive filtering by adaptive filter 24. FIG. 4 shows the processing pipeline with the gamma correction/de-correction operations. The processing of the data from the output of advance quantizer 21 to the input of adaptive filter 24 and the components used to process such data are the same as depicted in FIG. 2.

5. 1-Bit Case

Although the configuration described above works for 1 bit/channel, the overall color tends to be less saturated than the original. After quantization, the resulting image contains only eight colors. When the eight color image is processed by the 3D CMM, only a real black pixel will generate a K component. This tends to result in lighter images and also creates the potential for tone inversion.

Figure 5:
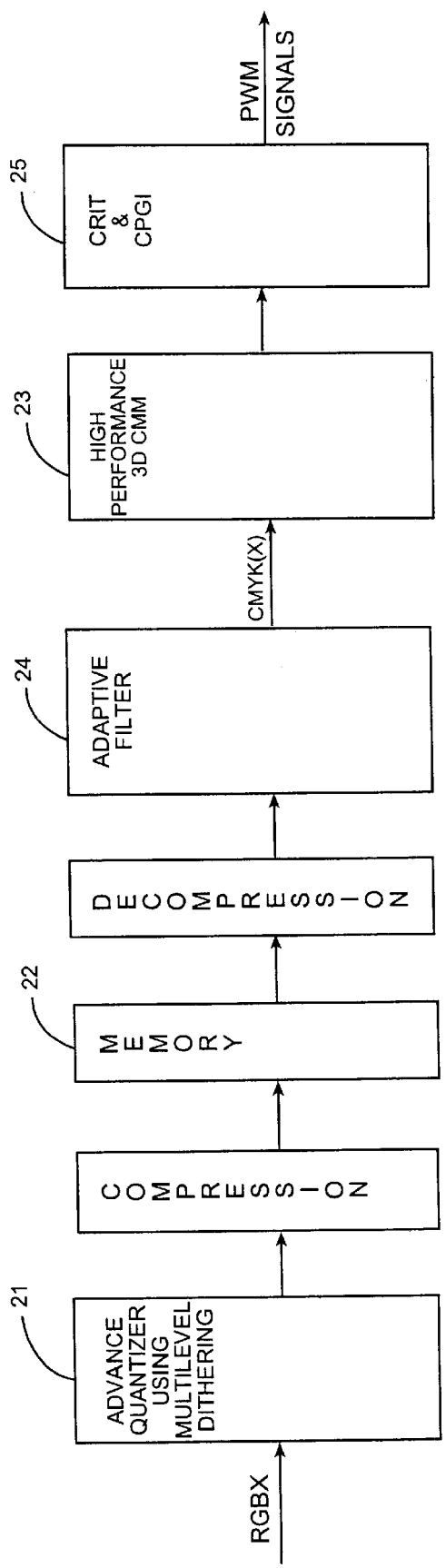
FIG. 5 is a block and flow diagram illustrating CPAA according to another embodiment of the invention.

To prevent these problems, the order of the adaptive filtering and high performance color matching management are switched. The pipeline for this processing is illustrated in FIG. 5. As shown in that figure, the decompressed data is first adaptively filtered by adaptive filter 24 and then is processed by high performance 3D CMM 23. This yields images with better color appearance. The inventors have further found that by using the post-filter approach described above, the restored images have only 17 levels/channel. This makes it possible to employ high performance 3D CMM 23 after adaptive filter 24 without using interpolation.

D. Effects and Implementations

As the foregoing description demonstrates, the present invention provides high performance, low memory and high quality solution for color laser printers. The CPAA architecture advantageously improves the flow of data through the processing pipeline to provide high speed at higher resolutions, e.g., at 600 and 1200 dpi. Advance quantizer 21 flexibly reduces bits to support fast ROP to achieve high performance with low memory requirements, which enables high performance 3D CMM 23 to perform color matching more quickly, while adaptive filter 24 maintains high quality.

The present invention may be conveniently implemented with software, hardware, or combination thereof. A hardware implementation may be realized, for example, using ASIC(s), PLD(s), FPLD(s), or the like. With these implementation alternatives in mind, it is to be understood that the block and flow diagrams show the performance of certain specified functions and relationships thereof. The boundaries of these functional blocks have been defined herein for convenience of description. Alternate boundaries may be defined so long as the specified functions are performed and relationships therebetween are appropriately maintained. The diagrams and accompanying description provide the functional information one skilled in the art would require to write program code (i.e., software) or to fabricate circuits (i.e., hardware) to perform the processing required.

Additionally, it should be noted that while all system components would typically be located in physical proximity to one another, such is not a requirement of the invention. For example, the input data (e.g., the RGBX signals) and/or the output data (e.g., the PWM signals) may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or other suitable electromagnetic carrier signals including infrared signals.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for processing color digital data, comprising the steps of:
    (a) receiving color digital data in the form of a plurality of digital elements, each digital element being represented in a first color space having a plurality of first base color components and being defined by n bits/base color component, $1 \leq n$;
    (b) performing quantization and multi-level dithering using a pre-defined dither matrix on the received digital elements to distribute a quantization error within the spatial domain, wherein the quantization and multi-level dithering reduces n to m, where m<n;
    (c) performing color matching by converting the representation of the digital elements from the first color space to a second color space having a plurality of second base color components using only a look-up table operation; and
    (d) adaptively filtering the color digital data based on a predetermined step size of the quantization;
    wherein step (c) is carried out either before or after step (d).

2. The method of claim 1, further comprising the steps of:
    compressing the received color digital data after step (b) is carried out;
    storing the compressed and dithered color digital data; and
    decompressing the stored color digital data before step (c) or (d), whichever is carried out first.

3. The method of claim 1, wherein the adaptive filtering of step (d) comprises applying a pre-defined filter kernel to a pre-filtered value of each digital element to generate a post-filtered value of that digital element, and accepting that digital element's post-filtered value if the absolute difference between its pre-filtered and post-filtered values is less than the predetermined step size of the quantization, otherwise retaining its pre-filtered value.

4. The method of claim 1, wherein the adaptive filtering of step (d) comprises applying a pre-defined filter kernel to pre-filtered values of a neighborhood of digital elements surrounding and including a currently examined digital element to generate corresponding post-filtered values for the neighborhood of digital elements, and replacing a particular digital element's pre-filtered value with its post-filtered value if the absolute difference between its post-filtered value and the pre-filtered value of the currently examined digital element is less than the predetermined step size of the quantization, otherwise replacing that particular digital element's pre-filtered value with the pre-filtered value of the currently examined pixel.

5. An apparatus for processing color digital data, comprising:
    an advance quantizer that receives color digital data in the form of a plurality of digital elements, each digital element being represented in a first color space having a plurality of first base color components and being defined by n bits/base color component, $1 \leq n$, wherein the advance quantizer performs quantization and multi-level dithering using a pre-defined dither matrix on the received digital elements to distribute a quantization error within the spatial domain, and wherein in performing quantization and multi-level dithering the advance quantizer reduces n to m, where m<n;
    a color matching module, in communication with the advance quantizer, that performs color matching by converting the representation of the digital elements from the first color space to a second color space having a plurality of second base color components using only a look-up table operation; and
    an adaptive filter, in communication with the color matching module, that filters the color digital data based on a predetermined step size of the quantization;
    wherein the color matching is performed either before or after the adaptive filtering.

6. The apparatus of claim 5, further comprising:
    a compression module that compresses color digital data output from the advance quantizer;
    a memory that stores the compressed and dithered color digital data; and
    a decompression module that decompresses the stored color digital data before color matching or adaptive filtering is performed, whichever occurs first.

7. The apparatus of claim 5, wherein the adaptive filter applies a pre-defined filter kernel to a pre-filtered value of each digital element to generate a post-filtered value of that digital element, and accepts that digital element's post-filtered value if the absolute difference between its pre-filtered and post-filtered values is less than the predetermined step size of the quantization, otherwise retaining its pre-filtered value.

8. The apparatus of claim 5, wherein the adaptive filter applies a pre-defined filter kernel to pre-filtered values of a neighborhood of digital elements surrounding and including a currently examined digital element to generate corresponding post-filtered values for the neighborhood of digital elements, and replaces a particular digital element's pre-filtered value with its post-filtered value if the absolute difference between its post-filtered value and the pre-filtered value of the currently examined digital element is less than the predetermined step size of the quantization, otherwise replacing that particular digital element's pre-filtered value with the pre-filtered value of the currently examined pixel.

9. The apparatus of claim 5, wherein the advance quantizer, the color matching module and the adaptive filter are embodied in image processing unit.

10. The apparatus of claim 5, wherein the advance quantizer, the color matching module and the adaptive filter are each implemented by either software or hardware.

11. A machine-readable medium having a program of instructions for directing a machine to process color digital data received by the machine in the form of a plurality of digital elements, each digital element being represented in a first color space having a plurality of first base color components and being defined by n bits/base color component, $1 \leq n$, the program of instructions comprising:

(a) instructions for performing quantization and multi-level dithering using a pre-defined dither matrix on the received digital elements to distribute a quantization error within the spatial domain, wherein the executed quantization and multi-level dithering reduces n to m, where m<n;

(b) instructions for performing color matching by converting the representation of the digital elements from the first color space to a second color space having a plurality of second base color components using only a look-up table operation; and (c) adaptively filtering the color digital data based on a predetermined step size of the quantization;

wherein instructions (b) are executed either before or after instructions (c).

12. The machine-readable medium of claim 11, further comprising:

instructions for compressing the received color digital data after instructions (a) are executed;

instructions for storing the compressed and dithered color digital data; and instructions for decompressing the stored color digital data before instructions (b) or (c) are executed, whichever are executed first.

13. The machine-readable medium of claim 11, wherein the adaptive filtering of executed by instructions (c) comprises applying a pre-defined filter kernel to a pre-filtered value of each digital element to generate a post-filtered value of that digital element, and accepting that digital element's post-filtered value if the absolute difference between its pre-filtered and post-filtered values is less than the predetermined step size of the quantization, otherwise retaining its pre-filtered value.

14. The machine-readable medium of claim 11, wherein the adaptive filtering executed by instructions (d) comprises applying a pre-defined filter kernel to pre-filtered values of a neighborhood of digital elements surrounding and including a currently examined digital element to generate corresponding post-filtered values for the neighborhood of digital elements, and replacing a particular digital element's pre-filtered value with its post-filtered value if the absolute difference between its post-filtered value and the pre-filtered value of the currently examined digital element is less than the predetermined step size of the quantization, otherwise replacing that particular digital element's pre-filtered value with the pre-filtered value of the currently examined pixel.

15. A circuit for processing color digital data, comprising:

an advance quantizer circuit that receives color digital data in the form of a plurality of digital elements, each digital element being represented in a first color space having a plurality of first base color components and being defined by n bits/base color component $1 \leq n$, wherein the advance quantizer circuit performs quantization and multi-level dithering using a pre-defined dither matrix on the received digital elements to distribute a quantization error within the spatial domain, and wherein in performing quantization and multi-level dithering the advance quantizer reduces n to m, where m<n;

a color matching circuit, in communication with the advance quantizer circuit, that performs color matching by converting the representation of the digital elements from the first color space to a second color space having a plurality of second base color components using only a look-up table operation; and an adaptive filter circuit, in communication with the color matching circuit, that filters the color digital data based on a predetermined step size of the quantization;

wherein the color matching is performed either before or after the adaptive filtering.

16. The circuit of claim 15, further comprising:

a compression circuit that compresses color digital data output from the advance quantizer;

a memory that stores the compressed and dithered color digital data; and a decompression circuit that decompresses the stored color digital data before color matching or adaptive filtering is performed, whichever occurs first.

17. The circuit of claim 15, wherein the adaptive filter circuit applies a pre-defined filter kernel to a pre-filtered value of each digital element to generate a post-filtered value of that digital element, and accepts that digital element's post-filtered value if the absolute difference between its pre-filtered and post-filtered values is less than the predetermined step size of the quantization, otherwise retaining its pre-filtered value.

18. The circuit of claim 15, wherein the adaptive filter circuit applies a pre-defined filter kernel to pre-filtered values of a neighborhood of digital elements surrounding and including a currently examined digital element to generate corresponding post-filtered values for the neighborhood of digital elements, and replaces a particular digital element's pre-filtered value with its post-filtered value if the absolute difference between its post-filtered value and the pre-filtered value of the currently examined digital element is less than the predetermined step size of the quantization, otherwise replacing that particular digital element's pre-filtered value with the pre-filtered value of the currently examined pixel.

19. The circuit of claim 15, wherein the circuit is an application specific integrated circuit, a programmable logic device, or field programmable logic device.

\* \* \* \* \*